(12) United States Patent
Handa

(10) Patent No.: US 7,949,697 B2
(45) Date of Patent: May 24, 2011

(54) BIT FIELD OPERATION CIRCUIT

(75) Inventor: Kenichi Handa, Tokyo (JP)

(73) Assignee: Oki Semiconductor Co., Ltd. (JP)

( * ) Notice: Subject to any disclaimer, the term of this patent is extended or adjusted under 35 U.S.C. 154(b) by 965 days.

(21) Appl. No.: 11/882,356

(22) Filed: Aug. 1, 2007

(65) Prior Publication Data
US 2008/0077643 A1    Mar. 27, 2008

(30) Foreign Application Priority Data

Sep. 26, 2006 (JP) ................... 2006-260613

(51) Int. Cl.
*G06F 15/00* (2006.01)
(52) U.S. Cl. .................. 708/209; 712/224; 712/300
(58) Field of Classification Search .............. 708/209; 312/224, 300
See application file for complete search history.

(56) References Cited

U.S. PATENT DOCUMENTS

| | | | | |
|---|---|---|---|---|
| 5,129,066 | A * | 7/1992 | Schmookler | 712/224 |
| 5,704,052 | A * | 12/1997 | Wu et al. | 712/204 |
| 6,430,684 | B1 * | 8/2002 | Bosshart | 712/300 |
| 7,350,058 | B2 * | 3/2008 | Carpenter et al. | 712/224 |
| 2003/0131030 | A1 * | 7/2003 | Sebot et al. | 708/209 |
| 2004/0193848 | A1 * | 9/2004 | Tavares | 712/224 |

FOREIGN PATENT DOCUMENTS

JP    9-114639    5/1997

* cited by examiner

*Primary Examiner* — Chuong D Ngo
(74) *Attorney, Agent, or Firm* — Studebaker & Brackett PC; Donald R. Studebaker

(57) ABSTRACT

A bit field operation circuit has a first shift unit, a mask shift amount control circuit, a second shift unit, a logic operation unit, and a selection unit. The first shift unit outputs a first intermediate data based on a first control signal. The mask shift amount control circuit outputs a mask shift control signal in accordance with a mask shift amount. The second shift unit outputs a second intermediate data based on a mask shift control signal. The third shift unit outputs a third intermediate data based on the first control signal. The logic operation unit performs logical operation of the second intermediate data and the third intermediate data, and outputs a mask selection data. The selection unit selects either one of the first intermediate data or the second input data based on the mask selection data to output as output data.

4 Claims, 10 Drawing Sheets

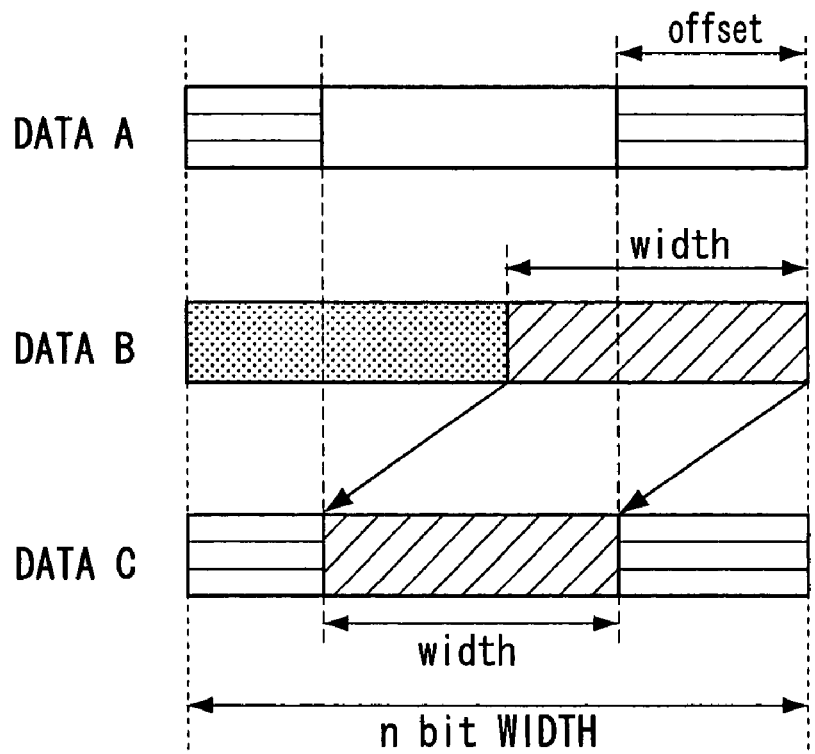

F I G. 5
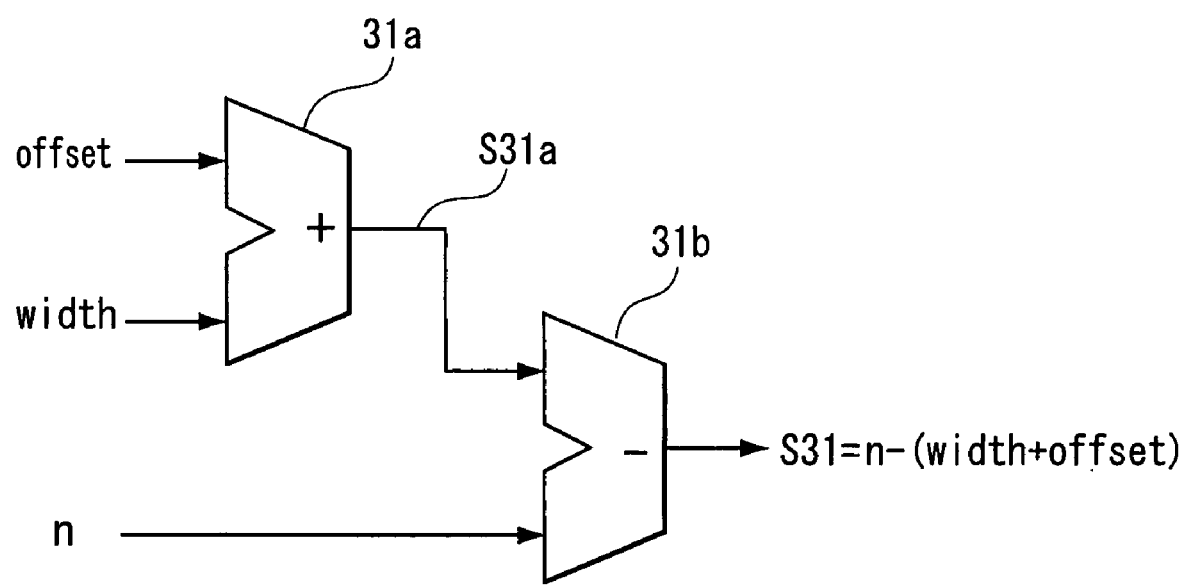

F I G. 6
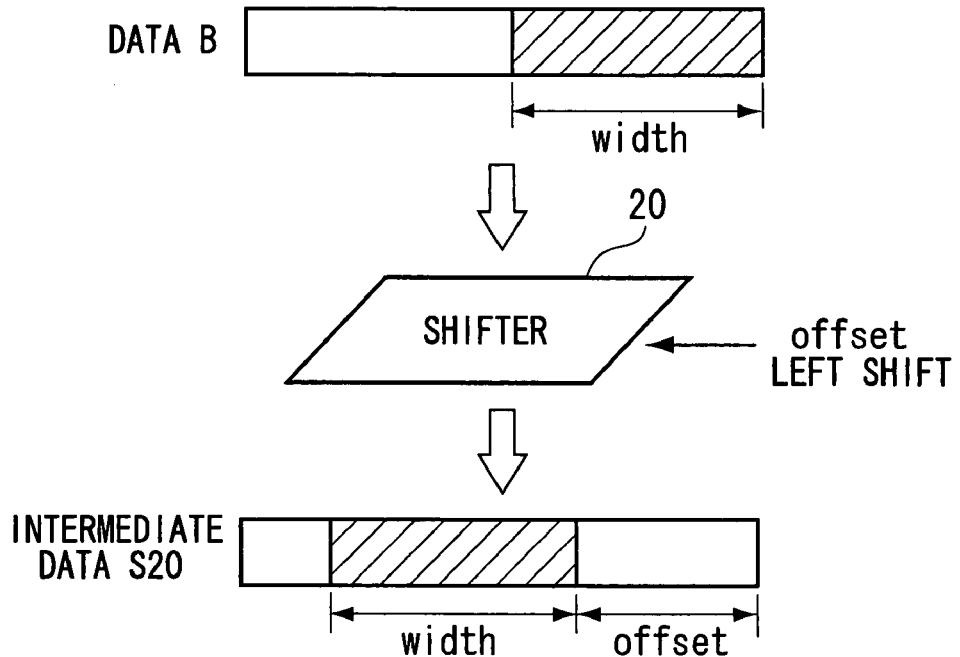
F I G. 7
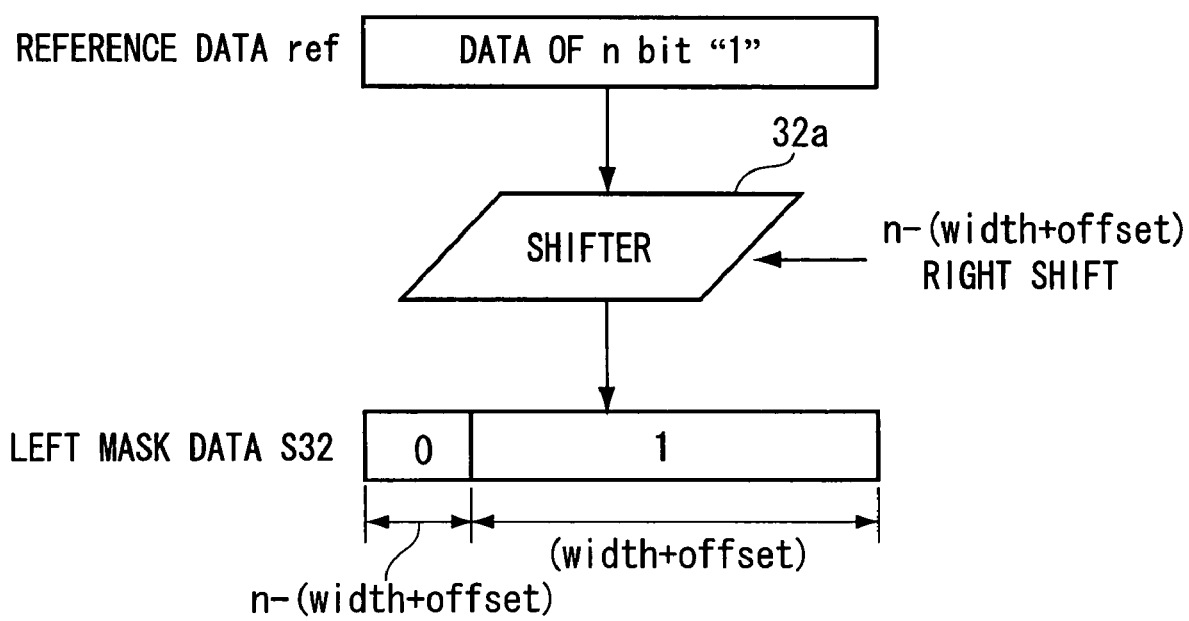

F I G. 8
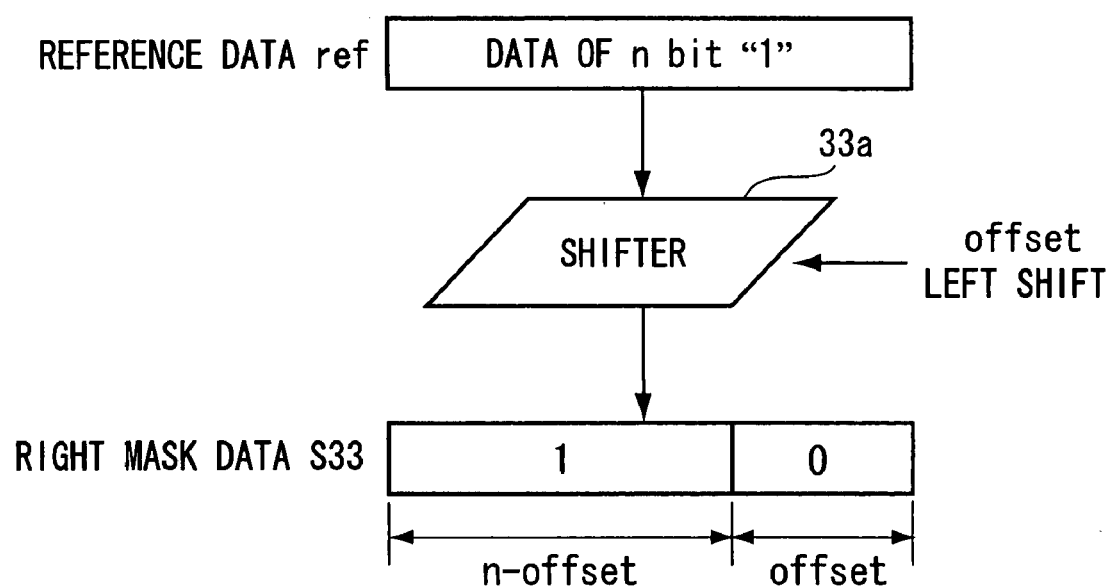

F I G. 1 1
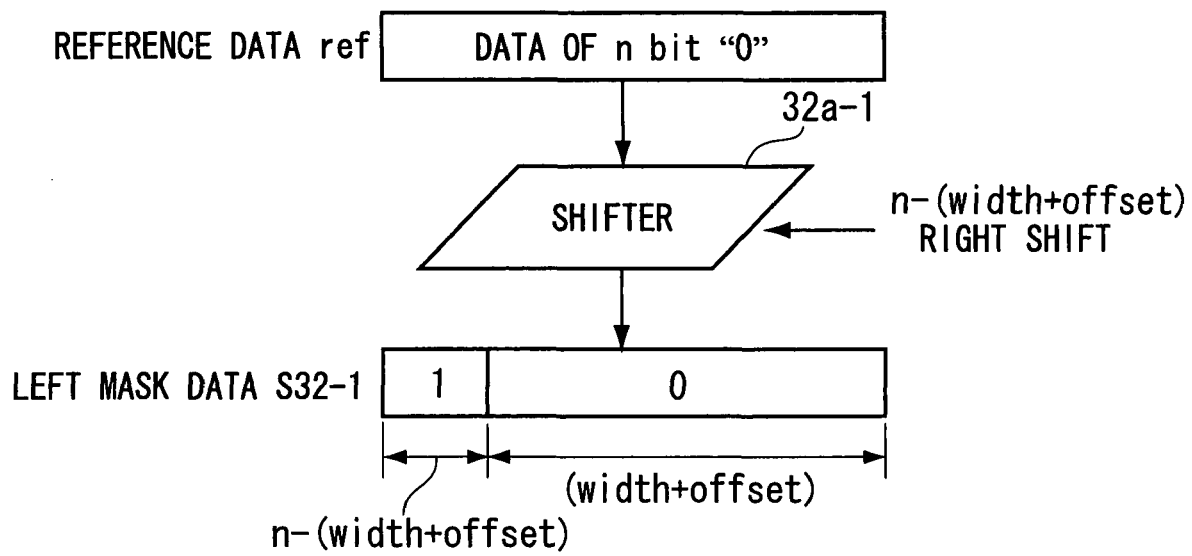
F I G. 1 2
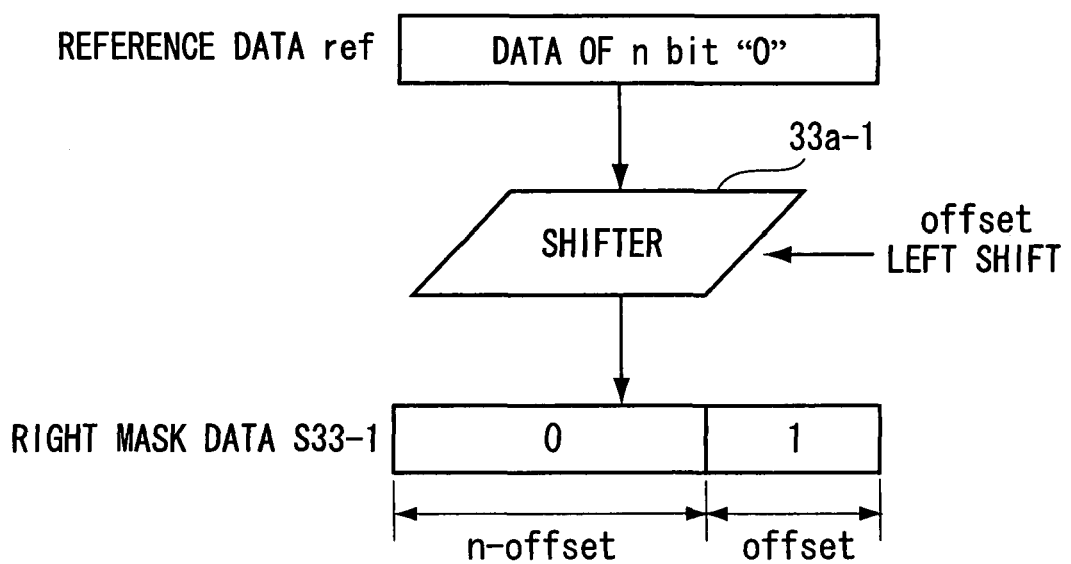

US 7,949,697 B2

BIT FIELD OPERATION CIRCUIT

CROSS-REFERENCE TO RELATES APPLICATION

This application claims priority under 35 USC 119 from Japanese Patent Application No. 2006-260613, the disclosure of which is incorporated by reference herein.

BACKGROUND OF THE INVENTION

1. Field of the Invention

The present invention relates to a bit field operation circuit operating a bit field which is a bit row in which a length is smaller than n (n being an integer of 2 or more) (hereinafter, refer to as "bit"), in a processor such as a central processing unit (hereinafter, refer to as "CPU"), a microprocessor (hereinafter, refer to as "MPU") having the CPU, a digital signal processor (hereinafter, refer to as "DSP") having the CPU, a multiplication circuit or the like, and the like.

2. Description of the Related Art

Conventionally, as an example of a bit field operation circuit having a mask data generation circuit for generating a mask data used for executing a bit field operation, for example, there has been a structure described in the following document.

In Japanese Patent Application Laid-Open (JP-A) No. 9-114639, for example, there is described a mask data generation circuit provided with a mask bit generation circuit and a shift computation circuit. The mask bit generation circuit outputs 32 bit mask bit in accordance with a 4 bit mask bit control signal and a 4 bit mask bit data. The shift computation circuit shifts the mask bit in a direction from a least significant bit (hereinafter, refer to as "LSB") to a most significant bit (hereinafter, refer to as "MSB") in correspondence to a 2 bit shifter control signal so as to generate a mask data.

FIG. 2 is a schematic view of an outline structure of the DSP having the conventional bit field operation circuit described in JP-A No. 9-114639 or the like.

The DSP is provided with a read only memory (hereinafter, refer to as "ROM") 11, a command decoder 12, and a bit field operation circuit 13. The ROM 11 stores a plurality of programs. The command decoder 12 decodes a command read from the ROM 11 and outputs various signals for executing the command. The control signal is input to the bit field operation circuit 13 from the command decoder 12, and the bit field operation circuit 13 stores a data B, and generates data S13c and S13d from the data B so as to output.

Further, the DSP is provided with a register 14, a selector 15, an arithmetic and logic unit (hereinafter, refer to as "ALU") 16 to which data S15 and S13c are input on the basis of the control signal from the command decoder 12, and an accumulator 17. The register 14 outputs the stored data A. The data A and C are input to the selector 15 on the basis of the control signal from the command decoder 12, and the selector 15 selects any one of them so as to output the data S15. The data S15 and S13c are input to the ALU 16 on the basis of the control signal from the command decoder 12, and the ALU 16 performs logical operation of the data S15 and S13c so as to output the data S16. The accumulator 17 temporarily stores the data S13d, and outputs the data C to the bit field operation circuit 13, the register 14 and the selector 15.

The bit field operation circuit 13 has a register 13a, a multiplication circuit 13b, a selector 13c and a selector 13d. The register 13a outputs the stored data B. The data B is input to the multiplication circuit 13b on the basis of the control signal from the command decoder 12, and the multiplication circuit 13b multiplies the data B so as to output the data S13b. The data B and S13b are input to the selector 13c on the basis of the control signal from the command decoder 12, and the selector 13c selects any one of them so as to output the data S13c. The data S16 and S13c are input to the selector 13d on the basis of the control signal from the command decoder 12, and the selector 13d selects any one of them so as to output the data S13d.

Next, a description will be given of an operation of the DSP shown in FIG. 2.

The register 13a outputs the data B so as to input to the multiplication circuit 13b. The multiplication circuit 13b multiplies the data B on the basis of the control signal from the command decoder 12 and outputs the data S13b to the selector 13c. The selector 13c outputs any one of the input data B or S13b as the data S13c to the ALU 16 and the selector 13d, on the basis of the control signal from the command decoder 12.

The register 14 outputs the data A so as to input to the selector 15. The data A and the data C output from the accumulator 17 are input to the selector 15, and the selector 15 selects any one of the data A or C on the basis of the control signal from the command decoder 12 so as to output as the data S15 to the ALU 16.

If the data S13c and S115 are input to the ALU 16, the ALU 16 performs logical operation of the data S13c and S15 on the basis of the control signal from the command decoder 12, and outputs the data S16 to the selector 13d. The data S13c and S16 are input to the selector 13d, and the selector 13d selects any one of the data S13c or S16 on the basis of the control signal from the command decoder 12 so as to output the data S13d to the accumulator 17. The accumulator 17 stores the data S13d so as to output as the data C to the register 13a, the register 14 and the selector 15.

FIG. 3 is a conceptual view of the bit field operation in the bit field operation circuit in FIG. 2. In FIG. 3, there is shown an example that the data C is generated from the data A and B expressed by n bits.

The data A has an offset amount offset, and the data B has a wide amount width. The data C is generated by inserting the wide amount width of the data B to a portion which is shifted to the left by the offset amount offset of the data A.

FIG. 4 is a view showing a program of the bit field operation in FIG. 3.

In a statement constituting the program in FIG. 4, in order to insert the wide amount width of the data B stored in the register 13a shown in FIG. 2 to the data A stored in the target resistor 14, a plurality of commands are executed by combining shift commands and operation commands.

The statement forwards the data indicated by 1 . . . 10 . . . 01 . . . 1 to X1 (corresponding to the register 14) in accordance with a load command LORD, and performs logical operation of the data A and the data forwarded to X1 corresponding to the register 14 in accordance with an and command AND. The load command LORD forwards the data indicated by 0 . . . 01 . . . 1 to X2 (corresponding to the register 13a). The and command AND performs logical operation of the data B and the data forwarded to X2 (corresponding to the register 13a). The shift command SFT shifts the data B to the left by the offset amount offset indicated by offset. The or command OR performs logical sum of the data A and the data B.

However, in the conventional bit field operation circuit, since the data C is generated by using the shift command SFT, the or command OR and the like, six cycles of statements are necessary. Accordingly, a processing amount within a fixed time is increased, a size of the ROM 11 is enlarged, and a manufacturing cost increase is caused.

SUMMARY OF THE INVENTION

The present invention has been made in view of the above circumstances and provides a bit field operation circuit.

According to an aspect of the invention, there is provided a bit field operation circuit comprising: a first shift unit that shifts n bits (n being an integer of 2 or more) of first input data in a direction from a least significant bit to a most significant bit based on a first control signal, and generates and outputs n bits of first intermediate data; a mask shift amount control circuit to which the first control signal, a second control signal and a third control signal are input, that determines a mask shift amount on the basis of the first, second and third control signals, and outputs a mask shift control signal in accordance with the mask shift amount; a second shift unit that shifts n bits of reference data in a direction from the most significant bit to the least significant bit based on the mask shift control signal, and generates and outputs n bits of second intermediate data; a third shift unit that shifts the reference data in a direction from the least significant bit to the most significant bit on the basis of the first control signal, and generates and outputs n bits of third intermediate data; a logic operation unit that performs a logical operation on the second intermediate data and the third intermediate data, and generates and outputs n bits of mask selection data; and a selection unit that selects either one of the first intermediate data or n bits of second input data based on the mask selection data so as to output as n bits of output data.

BRIEF DESCRIPTION OF THE DRAWINGS

Preferred embodiments of the present invention will be described in detail based on the following figures, wherein:

FIG. 3 is a conceptual view of a bit field operation in the bit field operation circuit in FIG. 2;

FIG. 4 is a view showing a program of the bit field operation in FIG. 3;

FIG. 5 is a schematic view of an outline showing an example of a mask shift amount control circuit 31 in FIG. 1;

FIG. 6 is a conceptual view showing an operation of a shifter 20 in FIG. 1;

FIG. 7 is a conceptual view showing an operation of a left mask data generation circuit 32 in FIG. 1;

FIG. 8 is a conceptual view showing an operation of a right mask data generation circuit 33 in FIG. 1;

FIG. 11 is a conceptual view showing an operation of a left mask data generation circuit 32-1 in FIG. 10;

FIG. 12 is a conceptual view showing an operation of a right mask data generation circuit 33-1 in FIG. 10.

DETAILED DESCRIPTION OF THE INVENTION

First Embodiment

Structure of First Embodiment

Figure 1:
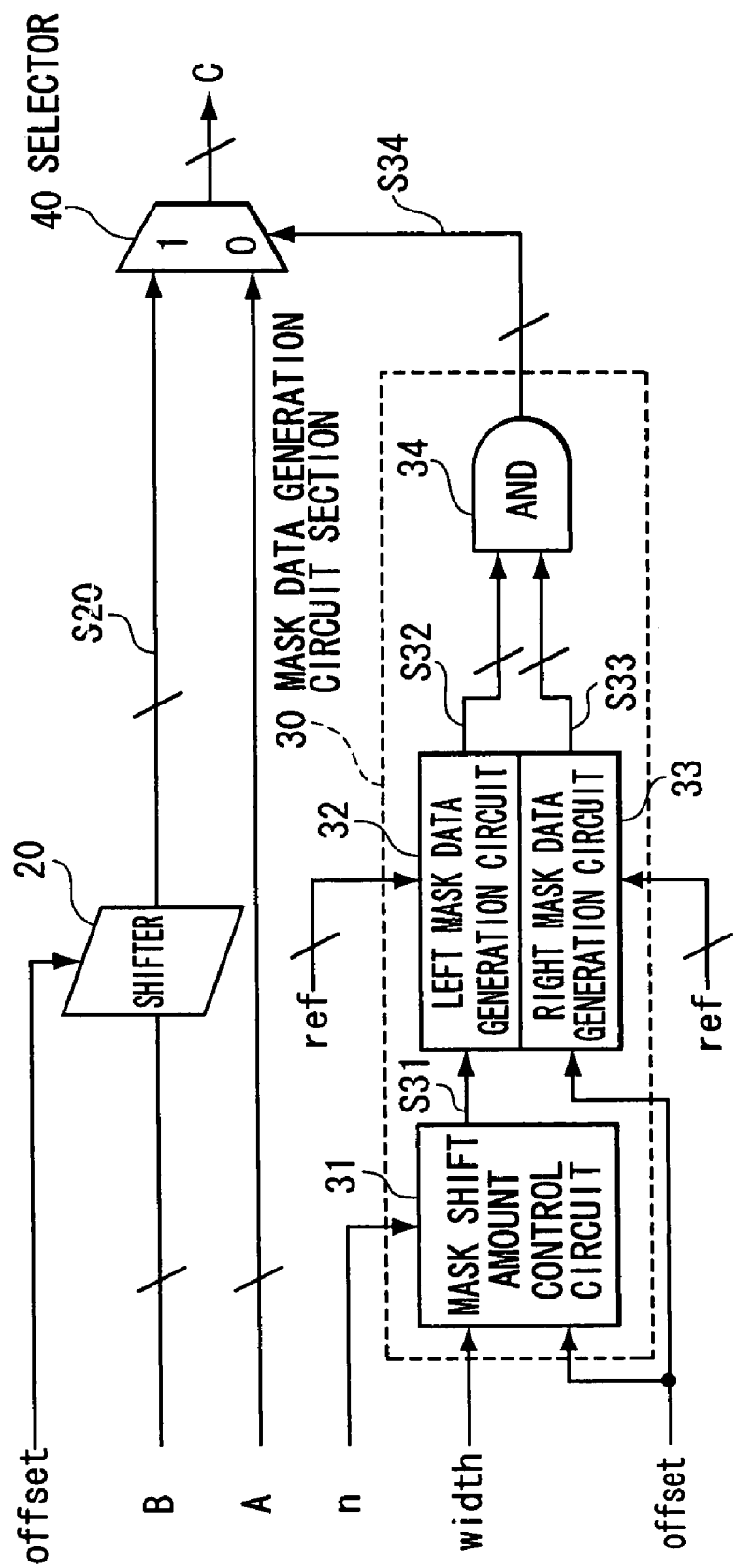
FIG. 1 is a schematic view of an outline of a bit field operation circuit showing a first embodiment in accordance with the invention.
Figure 2:
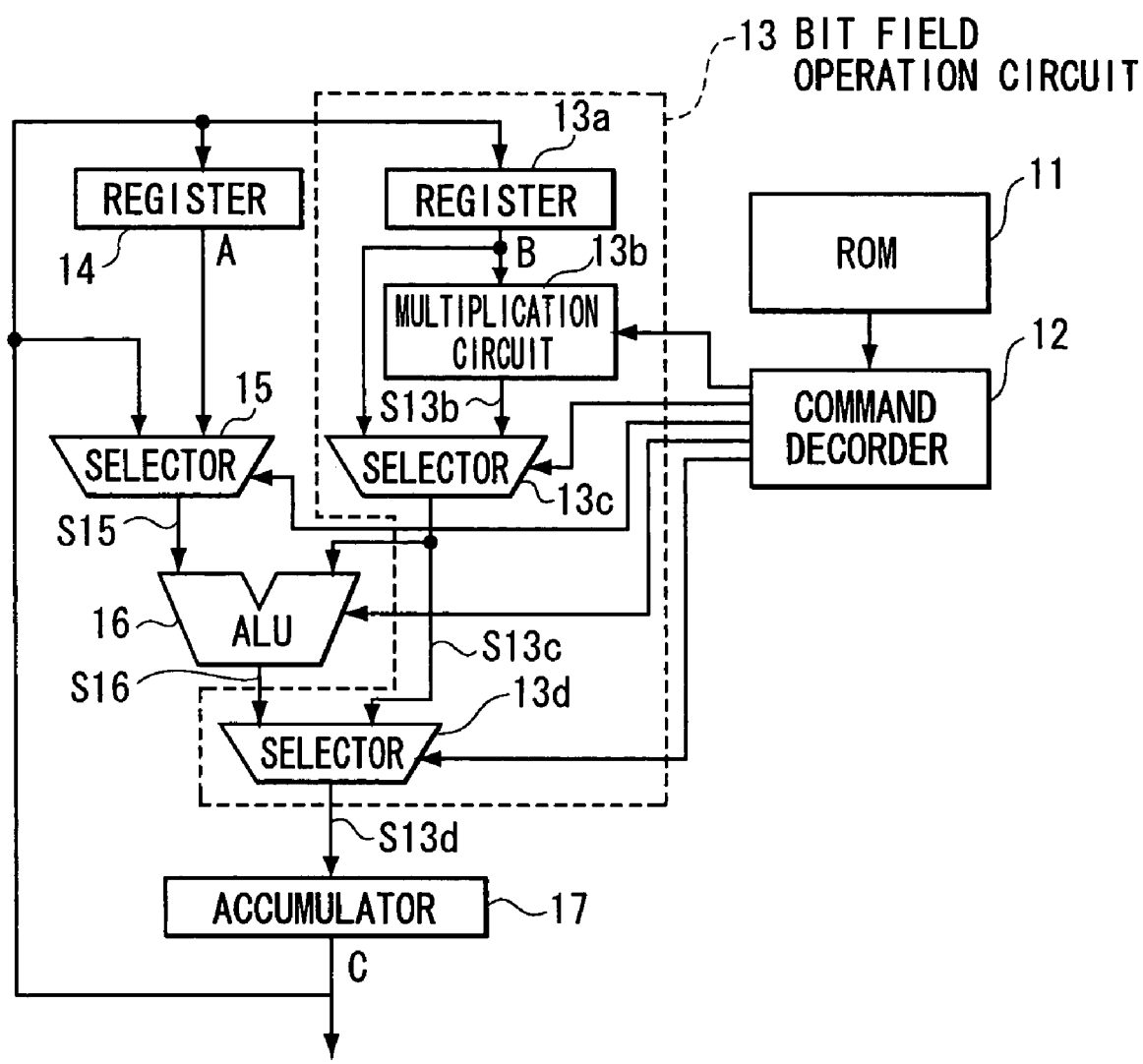
FIG. 2 is a schematic view of an outline of a DSP having a conventional bit field operation circuit.

FIG. 1 is a structure view of an outline of a bit field operation circuit showing a first embodiment in accordance with the present invention.

The bit field operation circuit in this first embodiment corresponds to a circuit provided in a processor, for example, a CPU, an MPU, a DSP or the like. The bit field operation circuit has a first shift unit (for example, a shifter) 20 and a mask data generation circuit section 30, and n number of selection units (for example, selectors) 40 are connected to an output side thereof.

The shifter 20 shifts n bits of first input data B to the left by an amount designated by a first control signal (for example, an offset amount) offset and outputs n bits of first intermediate data S20.

The mask data generation circuit section 30 is constituted by a mask shift amount control circuit 31, a second shift unit (for example, a left mask data generation circuit) 32, a third shift unit (for example, a right mask data generation circuit) 33, and n number of logic operation units (for example, AND gates) 34. An offset amount offset, a wide amount width and a bit amount n are input to the mask shift amount control circuit 31, and the mask shift amount control circuit 31 outputs a mask shift control signal S31. The left mask data generation circuit 32 shifts a reference data ref to the right on the basis of the mask shift control signal S31, and outputs n bits of second intermediate data (for example, a left mask data) S32. The right mask data generation circuit 33 shifts the reference data ref to the left on the basis of the offset amount offset, and outputs n bits of third intermediate data (for example, a right mask data) S33. The AND gate 34 calculates a logical product from the left mask data S32 and the right mask data S33, and outputs n bits of mask selection data S34.

The selector 40 selects any one of n bits of second input data A or intermediate data S20 on the basis of the mask selection data S34, and outputs n bits of output data C.

FIG. 5 is a schematic view of an outline showing an example of the mask shift amount control circuit 31 in FIG. 1.

The mask shift amount control circuit 31 is constituted by an adder 31a and a subtracter 31b. The adder 31a adds the offset amount offset and the wide amount width, and generates a fourth control signal (for example, an adding amount) S31a so as to output. The subtracter 31b subtracts the adding amount S31a from the bit amount n, and generates the mask shift control signal S31 corresponding to the expression mask shift amount n−(width+offset) so as to output.

Operation of First Embodiment

Figure 9:
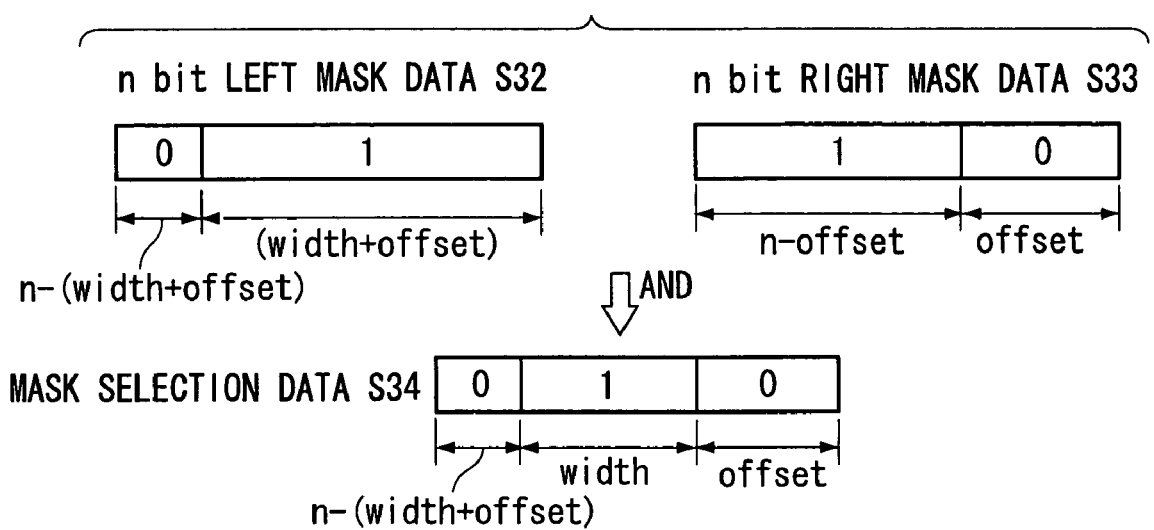
FIG. 9 is a conceptual view showing an operation of an AND gate 34 in FIG. 1.

FIG. 6 is a conceptual view showing an operation of the shifter 20 in FIG. 1. Further, FIG. 7 is a conceptual view showing an operation of the left mask data generation circuit 32, FIG. 8 is a conceptual view showing an operation of the right mask data generation circuit 33, and FIG. 9 is a conceptual view showing an operation of the AND gate 34 in FIG. 1.

In the bit field operation circuit in accordance with the present first embodiment, for example, the bit field operation is executed, for example, in accordance with a statement expressed as follows.

INS C, A, B, width, offset

In this statement, n bits of output data C are generated, to which a bit amount indicated by the wide amount width of the input data B has been inserted at a position which is shifted to the left by the offset amount offset from the input data A.

Next, a description will be given of a detailed operation of the bit field operation circuit in the case of executing the statement, in accordance with the following steps (1) to (6) with reference to FIGS. 6 to 9.

(1) The input data B is input to the shifter 20, and is shifted to the left on the basis of the offset amount offset. Accordingly, the intermediate data S20 is generated which is shifted to the left at the offset amount offset.

(2) The mask shift control signal S31 corresponding to the mask shift amount n−(width+offset) is generated on the basis of the offset amount offset, the wide amount width and the bit n which are input to the mask shift amount control circuit 31.

(3) The n bits of left mask data S32 is generated by shifting the reference data ref in which all the bits are constituted by "1", to the right by the mask shift amount n−(width+offset). In other words, the left mask data S32 has "0" in the width (n−width−offset) from MSB and "1" in the remaining width (width+offset) by filling blank bits due to the right shift with "0".

(4) The n bits of right mask data S33 is generated by shifting the reference data ref in which all the bits are constituted by "1" to the left at the offset amount offset. In other words, the right mask data S33 has "1" in the width (n−offset) from the MSB and "0" in the width of the remaining offset amount offset by filling blank bits due to the left shift with "0".

(5) The n bits of mask selection data S34 is generated by operating the logical product on a per bit basis by the left mask data S32 and the right mask data S33 generated in accordance with the steps (3) and (4).

(6) The mask selection data S34 generated in the step (5) is input to n number of selectors 40 on a per bit basis, thereby the intermediate data S20 generated in the step (1) is selected when the mask selection data S34 is "1" in each of the bits, and the input data A is selected when the mask selection data S34 is "0", and the selected data is output as the output data C.

Effect of First Embodiment

In accordance with the present first embodiment, since the mask data generation circuit section 30 is provided, it is possible to generate the output data C in one cycle on the basis of the input data A and B, the reference data ref, the offset amount offset, the wide amount width, and the bit amount n. Accordingly, the cycle number of the bit field operation command is shortened to one sixth, a processing amount within a fixed time is reduced, a size of the ROM becomes small, and it is possible to reduce a manufacturing cost.

Second Embodiment

Structure of Second Embodiment

Figure 10:
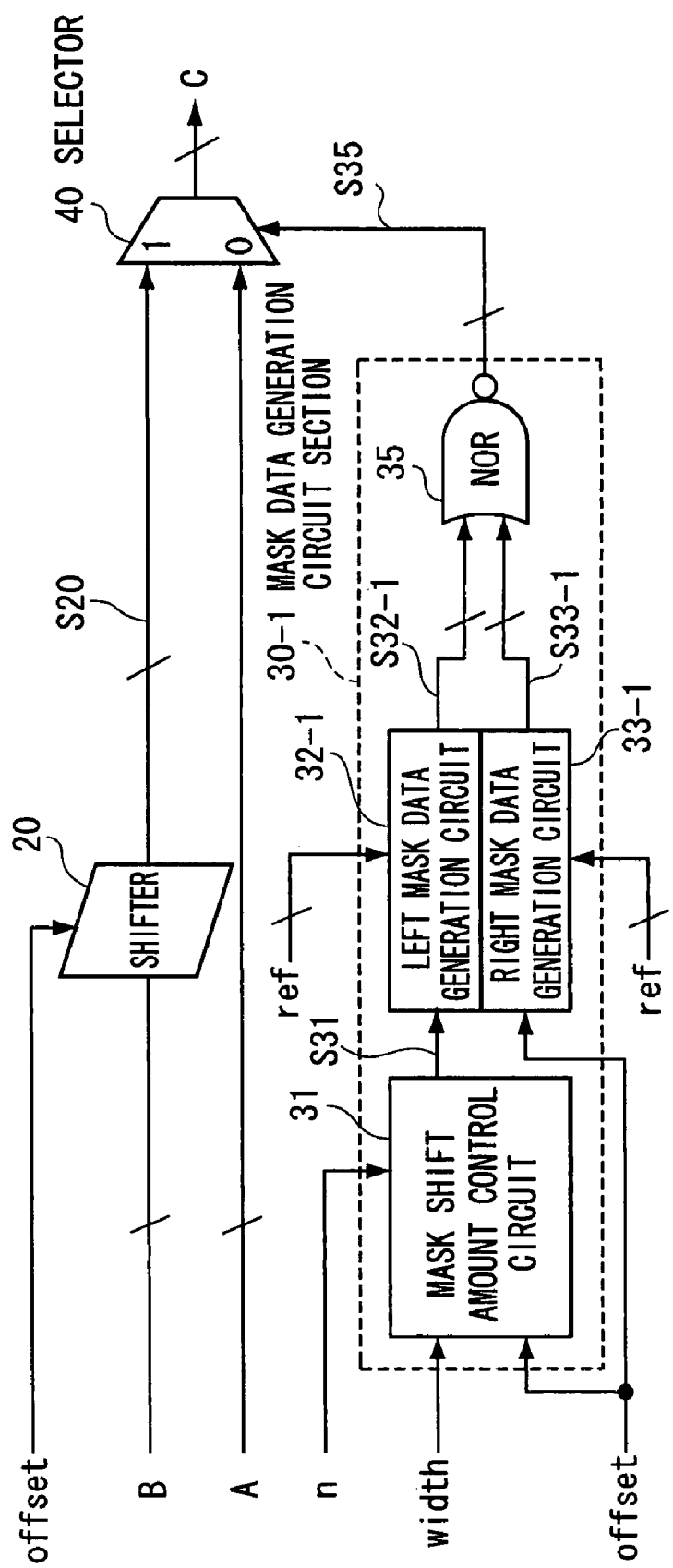
FIG. 10 is a schematic view of an outline of a bit field operation circuit showing a second embodiment in accordance with the invention.

FIG. 10 is a schematic view of an outline of a bit field operation circuit showing an second embodiment in accordance with the invention. The common reference numerals are attached to the common elements with the elements in FIG. 1 showing the first embodiment.

The bit field operation circuit in accordance with the second embodiment is constituted by the same shifter 20 as the first embodiment, a mask data generation circuit section 30-1 having a different structure from the first embodiment, and the same selector 40 as the first embodiment.

The mask data generation circuit 30-1 is structured such that all the bits of the reference data ref are constituted by "0", and an NOR gate 35 is provided in place of the AND gate 34, as is different from the mask data generation circuit section 30 in the first embodiment.

Operation of Second Embodiment

Figure 13:
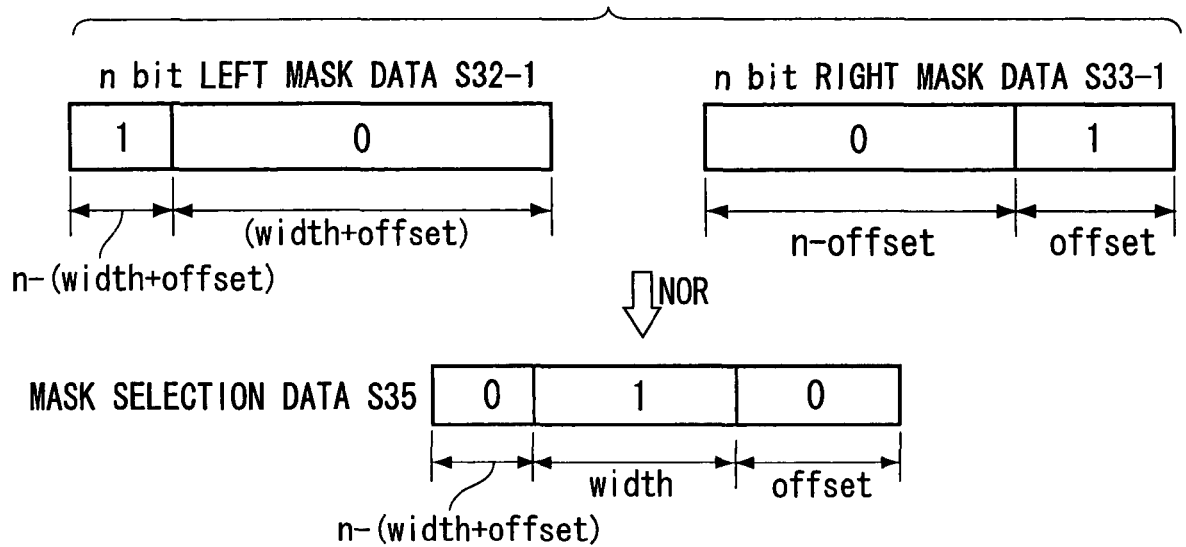
FIG. 13 is a conceptual view showing an operation of an NOR gate 35 in FIG. 10.

FIG. 11 is a conceptual view showing an operation of a left mask data generation circuit 32-1 in FIG. 10, FIG. 12 is a conceptual view showing an operation of a right mask data generation circuit 33-1 in FIG. 10, and FIG. 13 is a conceptual view showing an operation of the NOR gate 35 in FIG. 10.

In the bit field operation circuit in accordance with the present second embodiment, for example, the bit field operation is executed, for example, in accordance with a statement expressed as follows, in the same manner as the statement in the first embodiment.

INS C, A, B, width, offset

In this statement, the n bits of output data C is generated, to which a bit amount indicated by the wide amount width of the input data B has been inserted at a position which is shifted to the left by the offset amount offset from the input data A.

Next, a description will be given for a detailed operation of the bit field operation circuit in the case of executing the statement, in accordance with the following steps (1) to (6) with reference to FIGS. 6 and 11 to 13.

(1) The input data B is input to the shifter 20, and is shifted to the left on the basis of the offset amount offset. Accordingly, there is generated the intermediate data S20 which is shifted to the left by the offset amount offset.

(2) The mask shift control signal S31 corresponding to the mask shift amount n−(width+offset) is generated on the basis of the offset amount offset, the wide amount width and the bit n which are input to the mask shift amount control circuit 31.

(3) The n bits of left mask data S32-1 is generated by shifting the reference data ref in which all the bits are constituted by "0", to the right at the amount obtained by the mask shift amount n−(width+offset). In other words, the left mask data S32-1 has "1" in the width (n−width−offset) from MSB and "0" in the remaining width (width+offset) by filling blank bits due to the right shift with "1".

(4) The n bits of right mask data S33-1 is generated by shifting the reference data ref in which all the bits are constituted by "0" to the left at the offset amount offset. In other words, the right mask data S33-1 has "0" in the width (n−offset) from the MSB and "1" in the width of the remaining offset amount offset, by filling blank bits due to the left shift with "1".

(5) The n bits of mask selection data S35 is generated by operating the logical product on a per bit basis by the left mask data S32-1 and the right mask data S33-1 generated in accordance with the steps (3) and (4).

(6) The mask selection data S35 generated in the step (5) is input to n number of selectors 40 on a per bit basis, thereby he intermediate data S20 generated in the step (1) is selected when the mask selection data S34 is "1" in each of the bits, and the input data A is selected when the mask selection data S34 is "0", and the selected data is output as the output data C.

Effect of Second Embodiment

In accordance with the present second embodiment, the mask data circuit is provided, and the NOR gate 35 is provided in place of the AND gate 34 in accordance with the first embodiment. Accordingly, approximately in the same manner as the first embodiment, the cycle number of the bit field operation command is shortened to one sixth, a processing amount within a fixed time is reduced, a size of the ROM becomes small, and it is possible to reduce a manufacturing cost.

Modified Embodiment

The invention is not limited to the first and second embodiments mentioned above, but can employ various applied aspects and can be variously modified. As the applied aspects and the modified embodiments, for example, there are the following structures such as (a) to (c).

(a) The shifter 20 in FIGS. 1 and 10 is constituted by the shift computation circuit or the like, however, may be constituted by the other shift units such as a shift register or the like.

(b) The AND gate 34 in FIG. 1 and the NOR gate 35 in FIG. 10 may be constituted by the other logic operation units such as an EXOR gate or the like. It is possible to expect the same effect as those of the first and second embodiments.

(c) The selector 40 in accordance with FIGS. 1 and 10 is constituted by the multiplexer or the like, however, may be constituted by the other selection units.

(d) The mask shift amount control circuit 31 in FIG. 5 is constituted by the adder 31*a* and the subtracter 31*b*, however, may be constituted by the other ALU.

(e) The first and second embodiments are described about the DSP, however, can be applied to such a processor as the CPU, MPU or the like.

Embodiments of the invention are described above, but the invention is not limited to the embodiments as will be clear to those skilled in the art.

In accordance with the first aspect of the invention, there is provided a bit field operation circuit comprising: a first shift unit that shifts n bits (n being an integer of 2 or more) of first input data in a direction from a least significant bit to a most significant bit based on a first control signal, and generates and outputs n bits of first intermediate data; a mask shift amount control circuit to which the first control signal, a second control signal and a third control signal are input, that determines a mask shift amount on the basis of the first, second and third control signals, and outputs a mask shift control signal in accordance with the mask shift amount; a second shift unit that shifts n bits of reference data in a direction from the most significant bit to the least significant bit based on the mask shift control signal, and generates and outputs n bits of second intermediate data; a third shift unit that shifts the reference data in a direction from the least significant bit to the most significant bit on the basis of the first control signal, and generates and outputs n bits of third intermediate data; a logic operation unit that performs a logical operation on the second intermediate data and the third intermediate data, and generates and outputs n bits of mask selection data; and a selection unit that selects either one of the first intermediate data or n bits of second input data based on the mask selection data so as to output as n bits of output data.

In accordance with the structure mentioned above, the mask selection data is generated by performing logical operation of the second intermediate data generated by shifting the reference data to the right, and the third intermediate data generated by shifting the reference data to the left. Based on the mask selection data, it is possible to select either one of the first intermediate data or the second input data so as to output as the n bits of output data. Accordingly, the cycle number of the bit field operation command is shortened, the processing amount within the fixed time is reduced, the size of the ROM becomes small, and it is possible to reduce the manufacturing cost.

What is claimed is:

1. A bit field operation circuit comprising:
  a first shift unit that shifts n bits (n being an integer of 2 or more) of first input data in a direction from a least significant bit to a most significant bit based on a first control signal, and generates and outputs n bits of first intermediate data;
  a mask shift amount control circuit to which the first control signal, a second control signal and a third control signal are input, that determines a mask shift amount on the basis of the first, second and third control signals, and outputs a mask shift control signal in accordance with the mask shift amount;
  a second shift unit that shifts n bits of reference data in a direction from the most significant bit to the least significant bit based on the mask shift control signal, and generates and outputs n bits of second intermediate data;
  a third shift unit that shifts the reference data in a direction from the least significant bit to the most significant bit on the basis of the first control signal, and generates and outputs n bits of third intermediate data;
  a logic operation unit that performs a logical operation on the second intermediate data and the third intermediate data, and generates and outputs n bits of mask selection data; and
  a selection unit that selects either one of the first intermediate data or n bits of second input data based on the mask selection data so as to output as n bits of output data.

2. The bit field operation circuit of claim 1, wherein the logic operation unit performs the logical operation on the second intermediate data and the third intermediate data on a per bit basis, and outputs the mask selection data.

3. The bit field operation circuit of claim 1, wherein the logic operation unit performs a negative OR operation on the second intermediate data and the third intermediate data on a per bit basis, and outputs the mask selection data.

4. The bit field operation circuit of claim 1, wherein the mask shift amount control circuit comprises:
  an adder that adds the first control signal and the second control signal so as to output a fourth control signal; and
  a subtracter that subtracts the fourth control signal from the third control signal so as to output the mask shift control signal.

* * * * *